US005560980A

United States Patent [19]

Sakaki et al.

[11] Patent Number: 5,560,980

[45] Date of Patent: Oct. 1, 1996

[54] STACK OF RECORDING SHEETS WITH CLEANING SHEETS DISPERSED THEREIN AND METHOD OF MAINTAINING RECORDING APPARATUS

[75] Inventors: Mamoru Sakaki, Sagamihara; Yutaka Kurabayashi, Yokohama, both of Japan

[73] Assignee: Canon Kabushiki Kaisha, Tokyo, Japan

[21] Appl. No.: 218,884

[22] Filed: Mar. 28, 1994

Related U.S. Application Data

[63] Continuation of Ser. No. 942,184, Sep. 9, 1992, abandoned.

[30] Foreign Application Priority Data

Sep. 13, 1991 [JP] Japan .................................... 3-234458
Sep. 13, 1991 [JP] Japan .................................... 3-234459
Sep. 13, 1991 [JP] Japan .................................... 3-234717

[51] Int. Cl.$^{6}$ ........................................ B32B 9/00

[52] U.S. Cl. ........................ 428/195; 428/220; 355/296; 355/297; 347/105

[58] Field of Search .................................... 428/195, 206, 428/207, 913, 220; 355/211, 296, 297, 298; 347/105

[56] References Cited

U.S. PATENT DOCUMENTS 4,875,961 10/1989 Oike ........................................ 428/209
4,947,190 8/1990 Mizusawa ................................ 346/1.1
5,138,390 8/1992 Miyabayashi ............................ 355/211

FOREIGN PATENT DOCUMENTS 0379959 8/1990 European Pat. Off. .
63-111076 5/1988 Japan .
2092570 4/1990 Japan .
2218049 11/1989 United Kingdom .
2238510 6/1991 United Kingdom .

OTHER PUBLICATIONS

Encyclopedia of Polymer Science & Engineering vol. 10, pp. 780–783, Wiley & Sons 1987.

European Search Report.

*Primary Examiner*—Patrick Ryan
*Assistant Examiner*—Patrick Jewik
*Attorney, Agent, or Firm*—Fitzpatrick, Cella, Harper & Scinto

[57] ABSTRACT

An input stack of recording sheets and cleaning paper is provided. Each sheet is formed of a coated layer including pigment on a base material, while each cleaning paper has an adhesion strength ranging from 1 to 500 gf defined by JIS-Z-0237 and determined by a 90° peel method and is interspersed in the recording sheets.

6 Claims, 1 Drawing Sheet

STACK OF RECORDING SHEETS WITH CLEANING SHEETS DISPERSED THEREIN AND METHOD OF MAINTAINING RECORDING APPARATUS

This application is a continuation of application Ser. No. 07/942,184, filed Sep. 9, 1992, now abandoned.

BACKGROUND OF THE INVENTION

1. Field of the Invention

The present invention relates to a stack of recording sheets for performing a recording operation by use of recording sheets formed of coated paper, and to a method of maintaining a recording apparatus during the recording operation.

2. Description of the Related Art

A recording apparatus has hitherto been known which employs a paper feeding method utilizing means for contacting the recording surfaces of stacked recording sheets so as to feed them to a recording unit.

FIG. 4 shows an example of such a recording apparatus. Numeral 1 denotes a paper feed tray. A paper feed roller 3, serving as an example of a paper feed means, has the shape of one half of a cylinder, and is rotated counterclockwise, contacting the surfaces of recording sheets 2 stacked on the paper feed tray 1, and feeds them onto a platen 9.

When two or more recording sheets are erroneously fed simultaneously, a separation pad 4, which serves as a separation means, comes into contact with the bottom surface of the lower misfed recording sheet 2, utilizing frictional force between the pad 4 and the bottom surface to separate these sheets so that only a single sheet is fed onto pattern 9.

The recording sheet 2 is fed by carrying roller 5 to an ink jet recording head 6 of a recording unit, where an image is recorded. It is fed by a paper discharge roller 7 to a paper discharge tray 8, where it is stacked.

In an inkjet process, particularly in a full-color inkjet process in which many different color inks are utilized to perform a recording operation, coated paper has been used as recording sheets since it has a coated layer which includes a pigment on a base material. The reason for this is that in the inkjet process coloration and absorption of the ink are excellent, and thus clear images can be formed. However, after a large number of such recording sheets are fed to the above recording apparatus, poor feeding of recording sheets occurs.

SUMMARY OF THE INVENTION

An object of the present invention is therefore to provide an input stack of recording sheets with cleaning paper interspersed therein. When such recording sheets are fed to a recording apparatus to perform a recording operation, even when a large number of recording sheets are continuously fed, they are fed properly and reliably.

Another object of this invention is to provide a method of maintaining a recording apparatus using coated paper, wherein large numbers of recording sheets are used without incurring poor feeding of recording sheets.

In accordance with these objects, there is provided an input stack comprising a plurality of recording sheets, each consisting of a coated layer including pigment formed on a base material, and a cleaning paper having a surface adhesion strength ranging from 1 to 500 gf as defined by JIS-Z-0237 and determined by a 90° peel method, wherein the plurality of recording sheets are stacked and the cleaning paper is interspersed in the stack of recording sheets.

In another aspect of the invention there is provided an input stack comprising a plurality of recording sheets, each consisting of a coated layer including pigment formed on a base material, a cleaning paper having a smoothness of less than 40 seconds, wherein the plurality of sheets are stacked and the cleaning paper is interspersed in the stack of recording sheets.

In still yet another aspect of the invention there is provided a method of maintaining a recording apparatus having a recording unit and means for feeding a plurality of recording sheets to the recording unit, each of the recording sheets having a coated layer including pigment formed on a base material, the method comprising the step of feeding a sheet of cleaning paper to the recording unit, the cleaning paper having a smoothness of less than 40 seconds.

In yet a further aspect of the present invention there is provided a method of maintaining a recording apparatus having a recording unit as described above, the method comprising the step of feeding a sheet of cleaning paper to the recording unit, the cleaning paper having a surface adhesion strength ranging from 1 to 500 gf as defined by JIS-Z-0237 and determined by a 90° peel method.

DESCRIPTION OF THE PREFERRED EMBODIMENTS

Figure 4:
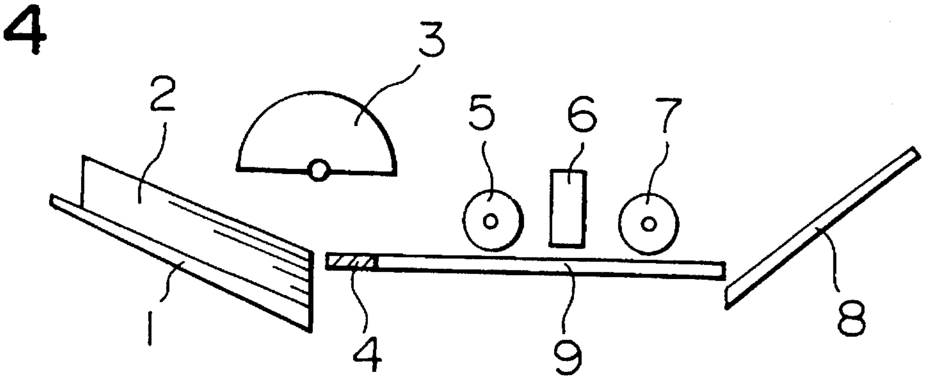
FIG. 4 is schematic view illustrating an example of a recording apparatus using an input stack of recording sheets in accordance with the present invention.

Recording sheets using coated paper tend not to be fed properly after a large number are in used. The inventors of this application have found that this is due to either one or a combination of the following reasons. During paper feeding, pigment is removed from a coated layer of the paper and it adheres to the separation or paper feed structure, thus reducing the frictional force between the recording sheet and the separation or paper feed structure. The separation structure must be scraped to remove the adhered pigment, or a binding resin adhered to the separation structure, thus increasing the frictional force between the separation structure and the recording sheet. The contamination of the separation structure has a significant adverse effect on feeding of recording sheets. In FIG. 4, a plurality of stacked recording sheets 2 on a paper feed tray 1 are successively carried by a paper feed roller 3 toward a separation pad 4, serving as a separation means. There are times when one recording sheet is placed on another and then carried simultaneously between the paper feed roller 3 and the separation pad 4.

In order for the two recording sheets to be fed one by one, the following equation must be satisfied:

$$\mu 1>\mu 3>\mu 2$$

where $\mu 1$ is a frictional force between the roller 3 and the obverse surface of one recording sheet; $\mu 2$ is a frictional force between the back surface of one recording sheet and the obverse surface of the other recording sheet; and $\mu 3$ is a frictional force between the separation pad 4 and the back surface of the other recording sheet.

In other words, when $\mu 1 \leqq \mu 2$, the paper feed roller 3 properly feeds the two recording sheets, whereas when $\mu 3 \leqq \mu 2$, these recording sheet are not separated.

When $\mu 1 \leqq \mu 3$, the paper feed roller 3 feeds only one recording sheet. In such a case, however, a frictional force between the recording sheet and the separation pad 4 is greater than the frictional force between the recording sheet and the paper feed roller 3, thus jamming the recording sheet in any case, when frictional force varies, recording sheets are not fed properly. The inventors have found that when cleaning paper having specific properties is fed at certain intervals during a recording operation, the contamination of the separation structure is effectively removed. This prevents poor feeding of recording sheets, and leads to the present invention.

Figure 1:
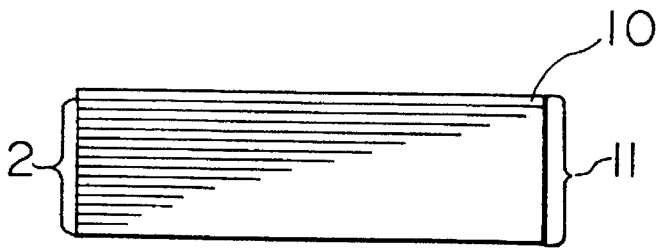
FIG. 1 is a side view showing an embodiment of an input stack of recording sheets and a cleaning paper.

As shown in FIG. 1, an input stack 11 for recording has a structure in which cleaning paper 10 is stacked on a plurality of recording sheets 2. Preferably, one sheet of cleaning paper is stacked on 20 to 500 recording sheets.

The cleaning paper is not necessarily stacked on the uppermost recording sheet as shown in FIG. 1, and may be appropriately interspersed in the stack of recording sheets at the above ratio.

The cleaning paper and the recording sheets are stacked such that the coated surface of the recording sheets and a self-adhesive surface of the cleaning paper, both described later, to face in the same direction. In other words, when recording sheets are stacked so that the coated surfaces thereof face upward, the cleaning paper is stacked so that the self-adhesive surface thereof also faces upward.

The number of recording sheets to be stacked is not limited to a specific number. It is determined when the handling of the sheets is considered, and ranges from several to 500.

Figure 2:
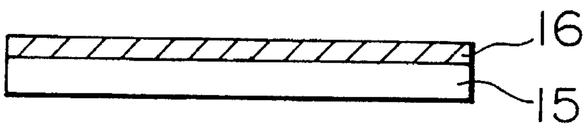
FIG. 2 is a side view showing an example of cleaning paper.

FIG. 2 shows an example of cleaning paper. It is a sheet having a self-adhesive surface layer 16 formed on a supporting member 15.

It is preferable that a sheet-like material, such as paper, cloth, plastic or a film, having a thickness of 50 μm to 2 mm, be used as the supporting member 15. A conventionally known self-adhesive may be used as the self-adhesive surface layer 16 on the cleaning paper. For example, the following substances may be used: synthetic rubber, such as natural and butyl rubber; acrylate ester copolymer, vinyl ether copolymer, silicone rubber, self-adhesives combined with these substances; and polymeric self-adhesive, such as ethylene-vinyl acetate copolymer, styrene-butadiene copolymer and styrene-isoprene. Resins, such as rosin, petroleum and terpene resins, providing adhesion, may be used as a component of the self-adhesive. Various additives, such as an adhesion-adjusting agent, an adhesion-improving agent, aging-preventing agent, a stabilizing agent and a coloring agent, may also be added as required.

The above self-adhesives may be formed as the self-adhesive surface layer 16 on the supporting member 15 by an application or impregnation method.

In this invention, the adhesion strength of the cleaning paper on which the self-adhesive surface layer 16 is formed ranges from 1 to 500 gf determined by a 90° peel method as defined by JIS-Z-0237. It is preferable that the amount of self-adhesive applied range from 0.5 to 50 g/m$^2$. The adhesion strength of the self-adhesive is adjusted in accordance with, for example, the amount and molecular weight of the self-adhesive.

Cleaning paper suitable for use in accordance with this invention may also be formed of so-called plain paper. The smoothness of the cleaning paper is less than 40 seconds, preferably less than 20 seconds, and more preferably less than 10 seconds. The smoothness described in this invention is Beck smoothness determined in accordance with the method defined by JIS-P-8119. A smoothness of more than 40 seconds is not desirable since the cleaning effect decreases.

The thickness of the cleaning paper ranges from 50 to 200 μm, and more preferably, from 50 to 1000 μm, as defined by JIS-P-8118. The shape of the cleaning paper is not limited to any specific shape, but is desirably the same as that of the recording sheet. Bond paper may be prepared as the cleaning paper, and cleaning paper includes but is not limited to bond paper. Wood-free, medium-quality and reproduced paper may also be prepared as the cleaning paper as required.

It is not necessary that the smoothness of both surfaces of the cleaning paper be less than 40 seconds, but the smoothness of at least one surface must be less than 40 seconds.

Figure 3:
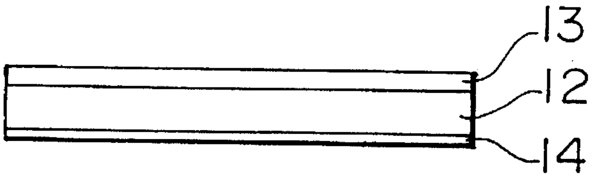
FIG. 3 is aside view showing an example of a recording sheet.

As shown in FIG. 3, illustrating an example of the recording sheet used in this invention, a coated surface layer 13 is formed on one surface of a base material 12 so as to serve as a recording surface. A back-coated layer 14 for preventing curling may be formed on the back surface, as required. Such a recording sheet construction is well known.

The base material 12 is formed of standard paper or a plastic film. The coated layer 13 is formed of resin serving as a pigment and a binder.

The smoothness of such a recording sheet is adjusted to 50 seconds or more in order to reduce the scattering of light on the recording surface thereof.

A method of maintaining a recording apparatus in accordance with this invention is to feed the cleaning paper stacked on the above recording sheets to the recording unit of the recording apparatus.

It is preferable that one or more sheets of cleaning paper be fed for every 500 recording sheets formed of the above coated paper to perform a stable recording operation.

In this manner, the cleaning paper interspersed in a stack of recording sheets is fed into the recording apparatus, thus preventing $\mu 1$, which is the friction coefficient of the recording sheets, from varying, and therefore prolonging stable feeding of the recording sheets.

The present invention will now be described in further detail with reference to the examples.

Example 1

A coating compound including 40 parts by weight of polyvinyl alcohol (PVA-217, manufactured by Kuraray Corp., having a saponification degree of 89 mol % and a polymerization degree of 1700) was applied to 100 parts by weight of alumina (AKP-G, which is γ-alumina manufactured by Sumitomo Chemical Co., Ltd.). The coating compound was applied by conventional procedures to form a coated layer on the obverse surface of a base paper having a basis weight of 100 g/m$^2$ and a Steckigt sizing degree of 2 seconds so that the weight of the coated layer became 5 g/m$^2$ after it had been dried. SBR latex (Nipol LX-430, manufactured by Nippon Zeon Co., Ltd.) was applied to the reverse surface of the base paper by the conventional procedure so that the weight of the back-coated layer became 2 g/m$^2$ after it had been dried. The base paper was then subjected to a supercalender process and used as a recording sheet. The smoothness of the recording sheet was 85 seconds.

Commercially available wood-free paper having a smoothness of 200 seconds was used as the supporting member of the cleaning paper. Self-adhesives 1 and 2 in Table 1 were blended and then the adhesion strength was adjusted in accordance with the amount of self-adhesive applied to coat the supporting member. Table 1 also shows the adhesion strength measured in accordance with a 90° peel method defined by JIS-Z-0237.

One sheet of the thus-prepared cleaning paper was interspersed for each 100 recording sheets in the stack of recording sheets.

Self-adhesive No. 3 in Table 1 was applied to a PET film so as to form another stack of recording sheets in the same manner as above.

It was possible to continuously feed 30,000 recording sheets when a recording operation was performed using the above two input stacks of recording sheets with interspersed cleaning paper and an inkjet recording apparatus having an inkjet recording head 6.

TABLE 1

| Self-adhesive | | | Bond strength | (gf) |
|---|---|---|---|---|
| 1 | Showa Highpolymer Co. Ltd. | acrylate ester self-adhesive | AB-410 | 250 |
| 2 | Arakawa Chemical Industries Ltd. | rosin glycerine ester | AAG | 15 |
| 3 | Dowcorning Toray Silicone Co. Ltd. | silicone resin | SH-4280 | 50 |

Example 2

Bond paper having a smoothness of 3 seconds was used as cleaning paper. One sheet of such cleaning paper was interspersed for each 100 recording sheets described in Example 1 so as to form a stack of recording sheets.

It was possible to continuously feed 30,000 recording sheets when a recording operation was performed using the above input stack of recording sheets and interspersed cleaning paper and the inkjet recording apparatus shown in FIG. 4.

Cleaning paper having a smoothness of 35 seconds, a thickness of 90 μm and a basis weight of 95 $g/m^2$ was prepared, and cleaning paper having a smoothness of 20 seconds, a thickness of 100 μm and a basis weight of 95 $g/m^2$ was prepared. It was possible to continuously feed 30,000 recording sheets when one sheet of the former cleaning paper was interspersed in every 50 recording sheets of the type described above and one sheet of the latter cleaning paper was interspersed in every 50 of the above-described recording sheets.

In contrast, after 9,000 ordinary recording sheets were continuously fed, poor feeding due to jammed sheets frequently occurred. It became impossible to feed any more than 15,000 recording sheets. The friction coefficients, $\mu 1$, $\mu 2$ and $\mu 3$, described previously were measured after the feeding of 15,000 recording sheets and it was confirmed that $\mu 1$ decreased and $\mu 3$ increased as compared to when the recording sheets were first continuously fed.

Example 3

A coated layer mainly formed of synthetic silica (Syloid 620 manufactured by Fuji Davison Chemical) and polyvinyl alcohol (PVA-117 manufactured by Kuraray Corp.) was formed by a conventional method on the obverse surface of base paper having a basis weight of 90 $g/m^2$ and a Steckigt sizing degree of 5 seconds. The amount of coating was 10 $g/m^2$. A back-coated layer formed of SBR latex (Nipol LX-430, manufactured by Nippon Zeon Co., Ltd.) was formed by the conventional procedure, and the amount of coating was 2 $g/m^2$. The base paper was then subjected to the supercalender process and used as a recording sheet. The smoothness of the recording sheet was 108 seconds.

An inkjet recording operation was performed using the above recording sheet having a thickness of 101 μm and a size of 210 mm×297 mm.

Wood-free paper having a smoothness of 5 seconds, a thickness of 104 μm and a size of 216 mm×279 mm was used as cleaning paper. A sheet of such cleaning paper was fed for each 500 recording sheets, as described above. It was found that even after 30,000 recording sheets had been fed, feeding of the recording sheets remained good.

When the recording operation was performed without using any cleaning paper, poor feeding of recording sheets due to jamming frequently occurred. After 12,000 recording sheets were fed, it became impossible to feed any additional recording sheets. When the frictional force of the recording apparatus was examined in relation to its condition before the recording operation started, it was confirmed that a frictional force ($\mu 1$) between the paper feed roller and the recording sheet decreased, whereas a frictional force ($\mu 3$) between the separation pad and the recording sheet increased.

Example 4

Wood-free paper having a smoothness of 23 seconds, a thickness of 105 μm and a size of 210 mm×290 mm, and wood-free paper having a smoothness of 29 seconds, a thickness of 89 μm and a size of 297 mm×420 mm were used as cleaning papers. Recording sheets were fed in the same manner as in Example 3. After 23,000 recording sheets were fed using the former cleaning paper, it became impossible to continue feeding recording sheets. After 18,000 recording sheets were fed using the latter cleaning paper, it became impossible to continue feeding recording sheets.

As has been described above, even when a recording apparatus having a feeding mechanism as shown in FIG. 4 records images on a stack of recording sheets, each having a coated layer including pigment, because of the interspersing of cleaning paper, a frictional force $\mu 1$ between the paper feed roller and the obverse surface of the recording sheet is maintained substantially at a constant level. This makes it possible to stably feed large numbers of recording sheets.

In addition, during a recording operation, cleaning paper is interspersed in recording sheets in a predetermined ratio, thereby reliably preventing poor feeding of recording sheets. A method of maintaining the recording apparatus is to simply feed the cleaning paper.

In this invention, when a recording apparatus is of an inkjet type in particular, the cleaning paper removes contamination of pigment and resin, that is, paper dust caused by the recording sheets in the apparatus, and therefore prevents the fine orifice of the inkjet recording head 6 shown in FIG. 4 from clogging.

While the present invention has been described with respect to what is presently considered to be the preferred embodiments, it is understood that the invention is not limited to the disclosed embodiments. The present invention is intended to cover various modifications and equivalent arrangements included within the spirit and scope of the appended claims.

What is claimed is:

1. A stacked member for an ink-jet recording apparatus, comprising:

a plurality of recording sheets, each consisting of a coated layer including pigment formed on a base material, and a cleaning paper comprising plain paper and having a smoothness of less than 40 seconds, wherein said plurality of sheets are stacked and said cleaning paper is interspersed for each 20 to 500 recording sheets in said stack of recording sheets.

2. A stacked member according to claim 1, wherein said cleaning paper is one of a wood-free paper and bond paper.

3. A stacked member according to claim 1, wherein said recording sheets are receptive to printing by an inkjet recording process.

4. A stacked member for an ink-jet recording apparatus having a paper feeding member and an ink-jet recording unit, said stacked member comprising:

a plurality of recording sheets, each consisting of a coated layer including pigment formed on a base material, and a cleaning paper having a surface adhesion strength ranging from 1 to 500 gf as defined by JIS-Z-0237 and determined by a 90° peel method, wherein said plurality of recording sheets are stacked and said cleaning paper is interspersed for each 20 to 500 recording sheets in said stack of recording sheets.

5. A stacked member according to claim 4, wherein said cleaning paper consists of a self-adhesive layer on a supporting member, said self-adhesive layer having said adhesion.

6. A stacked member according to claim 4, wherein said recording sheets are receptive to printing by an ink-jet recording process.

* * * * *

UNITED STATES PATENT AND TRADEMARK OFFICE

CERTIFICATE OF CORRECTION

PATENT NO. : 5,560,980

DATED : October 1, 1996

INVENTOR(S) : Mamoru Sakaki, et al.

It is certified that error appears in the above-indentified patent and that said Letters Patent is hereby corrected as shown below:

ON THE COVER PAGE:

Under References Cited "FOREIGN PATENT DOCUMENTS", item [56]

"2092570 4/1990 Japan"

should read

--2-92570 4/1990 Japan--.

Signed and Sealed this

Twenty-second Day of April, 1997

Attest:

Bruce Lehman

BRUCE LEHMAN

*Attesting Officer*

*Commissioner of Patents and Trademarks*